United States Patent [19]

Muroi et al.

[11] Patent Number: 5,505,348
[45] Date of Patent: Apr. 9, 1996

[54] MOLTEN STEEL POURING NOZZLE

[75] Inventors: Toshiyuki Muroi; Yoshiyuki Kondo, both of Gifu, Japan

[73] Assignee: Akechi Ceramics Co., Ltd., Gifu, Japan

[21] Appl. No.: 365,832

[22] Filed: Dec. 29, 1994

[30] Foreign Application Priority Data

Jan. 25, 1994 [JP] Japan .................................. 6-023792

[51] Int. Cl.⁶ .................................................. B22D 41/50
[52] U.S. Cl. ........................... 222/606; 266/236; 501/104
[58] Field of Search ............................ 266/236; 222/606, 222/607; 501/104, 106

[56] References Cited

U.S. PATENT DOCUMENTS 4,691,844  9/1987  Ishino et al. ............................ 222/591

FOREIGN PATENT DOCUMENTS

| 4100352 | 7/1991 | Germany . |
| 57-71860 | 5/1982 | Japan . |
| 64-40154 | 2/1989 | Japan . |
| 3-221249 | 9/1991 | Japan . |
| 2227962 | 8/1990 | United Kingdom . |
| 2263428 | 7/1993 | United Kingdom . |

OTHER PUBLICATIONS

Patent Abstracts of Japan, vol. 17, No. 675 (M–1526), 13 Dec. 1993 of JP–A–05 228593, (Akechi Ceramics KK), 7 Sep. 1993.

Database WPI, Week 8223, Derwent Publications Ltd., London, GB; AN 82-47306E of JP-A-57 071 860 (Kurosaki Refract KK), 4 May 1982 of JP-A-57 071 860 (Kurosaki Refract KK), 4 May 1982.

Patent Abstracts of Japan, vol. 13, No. 229 (M–831) [3577], 26 May 1989 of JP–A–01 044250 (Kawasaki Refract Co. Ltd.), 8 Oct. 1987.

Patent Abstracts of Japan, vol. 013, No. 225 (M–830), 25 May 1989 of JP–A–01 040154 (Akechi Ceramics KK), 10 Feb. 1989.

*Primary Examiner*—Scott Kastler
*Attorney, Agent, or Firm*—Frishauf, Holtz, Goodman, Langer & Chick

[57] ABSTRACT

A molten steel pouring nozzle having, along the axis thereof, a bore through which molten steel flows. At least part of an inner portion of the molten steel pouring nozzle, which inner portion forms the bore, is formed of a refractory consisting essentially of:

zirconia clinker comprising calcium zirconate: from 40 to 64.9 wt. %,
  where, a content of calcium oxide in the zirconia clinker being within a range of from 8 to 35 weight parts relative to 100 weight parts of the zirconia clinker, graphite: from 10 to 35 wt. %, and calcium silicate: from 25.1 to 50 wt. %,
  where, a content of calcium oxide in the calcium silicate being within a range of from 40 to 54 weight parts relative to 100 weight parts of the calcium silicate.

10 Claims, 1 Drawing Sheet

MOLTEN STEEL POURING NOZZLE

As far as we know, there are available the following prior art documents pertinent to the present invention:

(1) Japanese Patent Provisional Publication No.57-71,860;

(2) Japanese Patent Provisional Publication No.64-40,154; and (3) Japanese Patent Provisional Publication No. 3-221,249.

The contents of prior arts disclosed in the above-mentioned prior art documents will be discussed hereafter under the heading of the "BACKGROUND OF THE INVENTION".

BACKGROUND OF THE INVENTION

(FIELD OF THE INVENTION)

The present invention relates to a molten steel pouring nozzle which permits effective prevention of a reduction or a clogging of a bore of the nozzle, through which molten steel flows, when continuously casting an aluminum-killed molten steel containing aluminum.

(RELATED ART STATEMENT)

Continuous casting of molten steel is carried out, for example, by pouring molten steel received into a tundish from a ladle, through a molten steel pouring nozzle secured to a bottom wall of the tundish, into a vertical mold arranged below the molten steel pouring nozzle, to form a cast steel strand, and continuously withdrawing the thus formed cast steel strand as a long strand from the vertical mold.

As the above-mentioned molten steel pouring nozzle, a nozzle comprising an alumina-graphite refractory is widely used in general.

However, the molten steel pouring nozzle comprising an alumina-graphite refractory has the following problems:

When casting an aluminum-killed molten steel, aluminum added as a deoxidizer reacts with oxygen present in molten steel to produce non-metallic inclusions such as $\alpha$-alumina. The thus produced non-metallic inclusions such as $\alpha$-alumina adhere and accumulate onto the surface of a bore of the molten steel pouring nozzle, through which molten steel flows, to clog up the bore, thus making it difficult to achieve a stable casting. Furthermore, the non-metallic inclusions such as $\alpha$-alumina thus accumulated onto the surface of the bore, peel off or fall down, and are entangled into a cast steel strand, thus degrading the quality of the cast steel strand.

For the purpose of preventing the above-mentioned reduction or clogging of the bore of the molten steel pouring nozzle caused by the non-metallic inclusions such as $\alpha$-alumina present in molten steel, there is popularly used a method which comprises ejecting an inert gas from the surface of the bore of the molten steel pouring nozzle toward molten steel flowing through the bore, to prevent the non-metallic inclusions such as $\alpha$-alumina present in molten steel from adhering and accumulating onto the surface of the bore.

However, the above-mentioned method comprising ejecting an inert gas from the surface of the bore of the molten steel pouring nozzle toward molten steel flowing through the bore, has the following problems:

A larger amount of the ejected inert gas causes entanglement of bubbles produced by the inert gas into the cast steel strand, resulting in the production of defects such as pinholes in a steel product after the completion of the rolling. This problem is particularly serious in the casting of molten steel for a high-quality thin steel sheet. On the other hand, a smaller amount of the ejected inert gas causes adhesion and accumulation of the non-metallic inclusions such as $\alpha$-alumina onto the surface of the bore of the molten steel pouring nozzle, thus causing a reduction or a clogging of the bore. In the casting of molten steel for a long period of time, a stable control of the amount of an inert gas ejected from the surface of the bore of the molten steel pouring nozzle becomes gradually more difficult, according as a structure of the refractory forming the molten steel pouring nozzle is deteriorated. As a result, the non-metallic inclusions such as $\alpha$-alumina adhere and accumulate onto the surface of the bore of the molten steel pouring nozzle, thus causing a reduction or a clogging of the bore. Furthermore, in the casting of molten steel for a long period of time, furthermore, a local erosion of the surface of the bore of the molten steel pouring nozzle is considerably accelerated by the ejected inert gas. This makes it impossible to continue the ejection of the inert gas and may cause a rapid clogging of the bore.

With a view to preventing a reduction or a clogging of the bore of the molten steel pouring nozzle without the use of a mechanical means such as the ejection of an inert gas, there is disclosed in Japanese Patent Provisional Publication No. 57-71,860 published on May 4, 1982, a molten steel pouring nozzle formed of a refractory consisting essentially of:

graphite: from 10 to 50 wt. %, calcium oxide: from 20 to 75 wt. %, and the balance being metallic aluminum and silicon carbide (hereinafter referred to as the "prior art 1").

However, the above-mentioned molten steel pouring nozzle of the prior art 1 has the following problems:

It is true that calcium oxide (CaO) rapidly reacts with non-metallic inclusions such as $\alpha$-alumina, which are produced through the reaction of aluminum added to molten steel as a deoxidizer with oxygen present in the molten steel, to produce low-melting-point compounds such as $CaO \cdot Al_2O_3$ and $3CaO \cdot Al_2O_3$. Therefore, calcium oxide has a function of preventing the non-metallic inclusions such as $\alpha$-alumina from adhering and accumulating onto the surface of the bore of the nozzle. However, calcium oxide, when present alone, violently reacts with water or moisture in the air even at a room temperature to produce calcium hydroxide ($Ca(OH)_2$), which easily disintegrates and tends to become powdery, thus easily causing deterioration of the structure of the molten steel pouring nozzle. Great care is therefore necessary for storing the molten steel pouring nozzle. In addition, because of a high thermal expansion coefficient of calcium oxide, a considerable thermal stress is produced in the interior of the molten steel pouring nozzle when calcium oxide is present alone and the molten steel pouring nozzle is subjected to a heating which causes a non-uniform temperature distribution, thus resulting in a lower thermal shock resistance of the molten steel pouring nozzle.

For the problems as described above, it is difficult to use a molten steel pouring nozzle made of a refractory, in which calcium oxide is present alone, for a long period of time for the continuous casting of molten steel.

Furthermore, with a view to preventing a reduction or a clogging of the bore of the molten steel pouring nozzle without the use of a mechanical means such as the ejection of an inert gas, there is disclosed in Japanese Patent Provisional Publication No. 64-40,154 published on Feb. 10, 1989, another molten steel pouring nozzle formed of a refractory consisting essentially of:

graphite: from 10 to 40 wt. %, and calcium zirconate: from 60 to 90 wt. %, where, a content of calcium oxide in said calcium zirconate being within a range of from 23 to 36 weight parts relative to 100 weight parts of said calcium zirconate (hereinafter referred to as the "Prior art 2").

However, the above-mentioned molten steel pouring nozzle of the prior art 2 has the following problems:

For the purpose of overcoming the problems encountered in the prior art 1, in which calcium oxide is present alone, the molten steel pouring nozzle of the prior art 2 is formed of a refractory mainly comprising calcium zirconate. Therefore, it is true that contact of calcium oxide contained in calcium zirconate with the produced non-metallic inclusions such as α-alumina causes a rapid reaction between these components, thus producing low-melting-point compounds such as $CaO \cdot Al_2O_3$ and $3CaO \cdot Al_2O_3$. On the other hand, since calcium oxide is not present alone, no deterioration of the structure of the molten steel pouring nozzle is caused. In the prior art 2, however, calcium oxide contained in calcium zirconate does not move sufficiently toward the surface of the bore of the molten steel pouring nozzle, through which molten steel flows, so that calcium oxide does not come into sufficient contact with the produced nonmetallic inclusions such as α-alumina. As a result, the production of low-melting-point compounds brought about by the reaction between calcium oxide and the non-metallic inclusions such as α-alumina is insufficient to effectively prevent adhesion and accumulation of the non-metallic inclusions such as α-alumina onto the surface of the bore of the molten steel pouring nozzle.

Finally, with a view to preventing a reduction or a clogging of the bore of the molten steel pouring nozzle without the use of a mechanical means such as the ejection of an inert gas, there is disclosed in Japanese Patent Provisional Publication No. 3-221,249 published on Sep. 30, 1991, further another molten steel pouring nozzle formed of a refractory consisting essentially of:

zirconia clinker comprising calcium zirconate: from 40 to 89 wt. %, where, a content of calcium oxide in said zirconia clinker being within a range of from 8 to 35 weight parts relative to 100 weight parts of said zirconia clinker, graphite: from 10 to 35 wt. %, and calcium silicate: from 1 to 25 wt. %, where, a content of calcium oxide in said calcium silicate being within a range of from 4 to 54 weight parts relative to 100 weight parts of said calcium silicate (hereinafter referred to as the "Prior art 3").

However, the above-mentioned molten steel pouring nozzle of the prior art 3 has the following problems:

Calcium oxide in each particle of zirconia clinker easily moves toward the surface of each particle of zirconia clinker under the effect of coexistence of zirconia clinker with calcium silicate, and aggregates there. However, when molten steel contains a large amount of alumina($Al_2O_3$), calcium oxide can not be supplied in an amount sufficient to react with alumina in molten steel. In addition, when a temperature of molten steel is low, and in particular, at the time when the casting of molten steel starts or just before the completion of casting of one charge, in which the remaining amount of molten steel becomes small, a temperature of a portion of the molten steel pouring nozzle, which comes into contact with molten steel, becomes lower so that the movement and the aggregation of calcium oxide in each particle of zirconia clinker toward and on the surface of each particle of zirconia clinker are decreased or discontinued, and as a result, an amount of calcium oxide to react with alumina in molten steel becomes insufficient. It is therefore impossible to effectively prevent adhesion and accumulation of the non-metallic inclusions such as α-alumina onto the surface of the bore of the molten steel pouring nozzle.

Under such circumstances, there is a strong demand for the development of a molten steel pouring nozzle which permits prevention of a reduction or a clogging of a bore of the nozzle and deterioration of the structure of a refractory forming the nozzle economically and for a long period of time without the use of a mechanical means such as the ejection of an inert gas, even when a temperature of molten steel is low or molten steel contains a large amount of non-metallic inclusions such as α-alumina, but such a molten steel pouring nozzle has not as yet been proposed.

SUMMARY OF THE INVENTION

An object of the present invention is therefore to provide a molten steel pouring nozzle which permits prevention of a reduction or a clogging of a bore of the nozzle and deterioration of the structure of a refractory forming the nozzle economically and for a long period of time without the use of a mechanical means such as the ejection of an inert gas, even when a temperature of molten steel is low or molten steel contains a large amount of non-metallic inclusions such as α-alumina.

In accordance with one of the features of the present invention, there is provided a molten steel pouring nozzle having, along the axis thereof, a bore through which molten steel flows, wherein:

at least part of an inner portion of said molten steel pouring nozzle, which inner portion forms said bore, is formed of a refractory consisting essentially of:

zirconia clinker comprising calcium zirconate: from 40 to 64.9 wt. %, where, a content of calcium oxide in said zirconia clinker being within a range of from 8 to 35 weight parts relative to 100 weight parts of said zirconia clinker, graphite: from 10 to 35 wt. %, and calcium silicate: from 25.1 to 50 wt. %, where, a content of calcium oxide in said calcium silicate being within a range of from 40 to 54 weight parts relative to 100 weight parts of said calcium silicate.

DETAILED DESCRIPTION OF PREFERRED EMBODIMENTS

Figure 1:
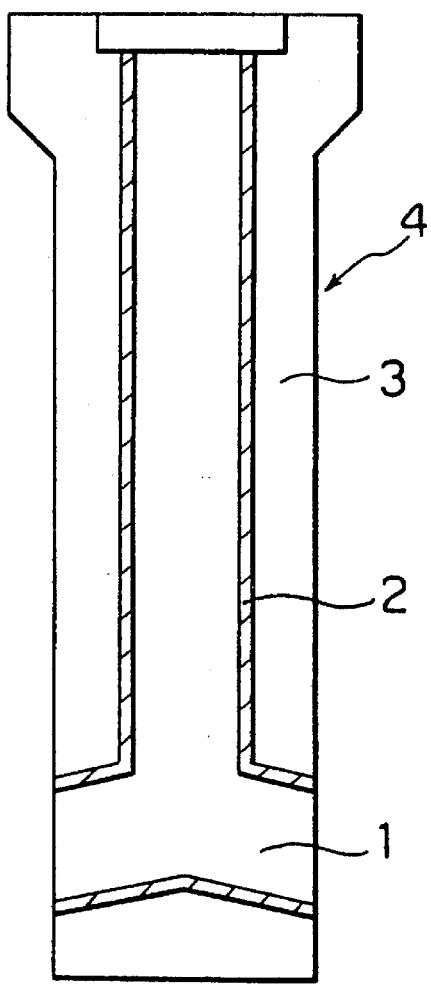
FIG. 1 is a schematic vertical sectional view illustrating a first embodiment of the molten steel pouring nozzle of the present invention as an immersion nozzle.

From the above-mentioned point of view, extensive studies were carried out to develop a molten steel pouring nozzle which permits prevention of a reduction or a clogging of a bore of the nozzle and deterioration of the structure of a refractory forming the nozzle economically and for a long period of time without the use of a mechanical means such as the ejection of an inert gas, even when a temperature of molten steel is low or molten steel contains a large amount of non-metallic inclusions.

As a result, the following findings were obtained:

(1) It is possible to inhibit a violent reaction of calcium oxide with water or moisture in the air, thus preventing deterioration of the structure of a molten steel pouring nozzle, by forming the molten steel pouring nozzle with the use of a refractory containing zirconia clinker comprising calcium zirconate. More particularly, zirconia clinker comprising calcium zirconate and having a prescribed particle size is prepared by melting calcium oxide and zirconia in an electric furnace at a high temperature of at least 1,600°C., then cooling the resultant melt to solidify same, and then pulverizing the resultant solid. The thus prepared zirconia clinker, which comprises calcium zirconate ($CaO \cdot ZrO_2$), is stable similarly to stabilized zirconia, and has a low thermal expansion coefficient, and inhibits violent reaction of calcium oxide with water or moisture in the air, thus preventing deterioration of the structure of the molten steel pouring nozzle.

(2) When the above-mentioned zirconia clinker comprising calcium zirconate coexists with calcium silicate ($CaO \cdot SiO_2$), calcium oxide in each particle of zirconia clinker tends to easily move toward the surface of each particle of zirconia clinker under the effect of the above-mentioned coexisting calcium silicate. In other words, calcium oxide, which is to react with $\alpha$-alumina in molten steel, which is a main constituent of the non-metallic inclusions adhering onto the surface of the bore of the molten steel pouring nozzle, moves toward the surface of each particle of zirconia clinker and aggregates there.

(3) In addition to the above-mentioned function, calcium silicate has a function of replenishing the quantity of calcium oxide, which is to react with a $\alpha$-lumina in molten steel.

(4) When the content of calcium silicate is within a specific range, it is possible to effectively prevent adhesion and accumulation of the non-metallic inclusions such as $\alpha$-alumina onto the surface of the bore of the molten steel pouring nozzle, even when a temperature of molten steel is low or molten steel contains a large amount of non-metallic inclusions such as $\alpha$-alumina.

(5) Calcium silicate which is poor in refractoriness, when used together with graphite and zirconia clinker comprising calcium zirconate, never causes degradation of refractoriness of the refractory.

(6) It is thus possible to inhibit a violent reaction of calcium oxide with water or moisture in the air, facilitate the reaction between calcium oxide and non-metallic inclusions such as $\alpha$-alumina, permit such a reaction to continue for a long period of time to produce low-melting-point compounds such as $CaO \cdot Al_2O_3$ and $3CaO \cdot Al_2O_3$, and thus to effectively prevent, for a long period of time, the non-metallic inclusions such as $\alpha$-alumina from adhering and accumulating onto the surface of the bore of the molten steel pouring nozzle, even when a temperature of molten steel is low or molten steel contains a large amount of non-metallic inclusions such as $\alpha$-alumina, by using the molten steel pouring nozzle formed of the refractory which comprises (a) zirconia clinker comprising calcium zirconate, (b) graphite and (c) calcium silicate in prescribed ranges, respectively.

The present invention was made on the basis of the above-mentioned findings. At least part of an inner portion of the molten steel pouring nozzle of the present invention, which inner portion forms a bore thereof, is formed of a refractory consisting essentially of:

Zirconia clinker comprising calcium zirconate: from 40 to 64.9 wt. %,
where, a content of calcium oxide in said zirconia clinker being within a range of from 8 to 35 weight parts relative to 100 weight parts of said zirconia clinker, graphite: from 10 to 35 wt. %, and calcium silicate: from 25.1 to 50 wt. %,
where, a content of calcium oxide in said calcium silicate being within a range of from 40 to 54 weight parts relative to 100 weight parts of said calcium silicate.

Now, the following paragraphs describe the reasons of limiting the chemical composition of the refractory forming at least part of an inner portion of the molten steel pouring nozzle of the present invention, which inner portion forms a bore thereof, as described above.

(1) Zirconia clinker comprising calcium zirconate:

Zirconia cliker has a low thermal expansion coefficient and is excellent in spalling resistance. With a content of zirconia clinker of under 40 wt. %, however, the amount of calcium oxide, which is to react with the non-metallic inclusions such as $\alpha$-alumina in molten steel, becomes insufficient, thus making it impossible to prevent adhesion and accumulation of the non-metallic inclusions such as $\alpha$-alumina onto the surface of the bore of the molten steel pouring nozzle. With a content of zirconia clinker of over 64.9 wt. %, on the other hand, the thermal expansion coefficient of the nozzle becomes higher, and spalling resistance thereof is deteriorated. The content of zirconia clinker should therefore be limited within a range of from 40 to 64.9 wt. %. Zirconia clinker should preferably have an average particle size of up to 44 μm in order to ensure a satisfactory surface smoothness of the nozzle.

(2) Calcium oxide contained in zirconia clinker comprising calcium zirconate:

Calcium oxide contained in zirconia clinker, of which the property of violently reacting with water or moisture in the air is largely decreased, reacts with the non-metallic inclusions such as $\alpha$-alumina in molten steel to produce low-melting-point compounds such as $CaO \cdot Al_2O_3$ and $3CaO \cdot Al_2O_3$. However, with a content of calcium oxide in zirconia clinker of under 8 weight parts relative to 100 weight parts of zirconia clinker, a desired effect as described above is unavailable, and the presence of baddeleyite ($ZrO_2$) in zirconia clinker causes deterioration of the structure of the molten steel pouring nozzle. With a content of calcium oxide in zirconia clinker of over 35 weight parts relative to 100 weight parts of zirconia clinker, on the other hand, calcium oxide, which is not dissolved in the form of solid-solution into calcium zirconate, reacts violently with water or moisture in the air, and has a high thermal expansion coefficient, is present alone in zirconia clinker, resulting in deterioration of the structure of the molten steel pouring nozzle. The content of calcium oxide in zirconia clinker should therefore be limited within a range of from 8 to 35 weight parts relative to 100 weight parts of zirconia clinker.

(3) Graphite:

Graphite has a function of improving oxidation resistance of a refractory and wetting resistance thereof against molten steel, and increasing thermal conductivity of the refractory. Particularly, natural graphite is suitable for obtaining the above-mentioned function. With a content of graphite of under 10 wt. %, however, a desired effect as described above cannot be obtained, and spalling resistance of the molten steel pouring nozzle becomes poorer. With a content of graphite of over 35 wt. %, on the other hand, corrosion resistance of the nozzle is degraded. The content of graphite should therefore be limited within a range of from 10 to 35 wt. %. Graphite should preferably have an average particle size of up to 500 μm with a view to improving the above-mentioned function.

(4) Calcium silicate:

Calcium silicate ($CaO \cdot SiO_2$) has a function of promoting calcium oxide in each particle of zirconia clinker to move toward the surface of each particle of zirconia clinker and to aggregate there. Calcium silicate has furthermore a function of replenishing the quantity of calcium oxide, which is to react with non-metallic inclusions such as α-alumina in molten steel. With a content of calcium silicate of under 25.1 wt. %, however, when molten steel contains a large amount of alumina, calcium oxide in an amount sufficient to react with the alumina in molten steel can not be replenished, even though calcium oxide in each particle of zirconia clinker moves toward the surface of each particle of zirconia clinker and aggregate there. In addition, with a content of calcium silicate of under 25.1 wt. %, when a temperature of molten steel is low, and in particular, at the time when the casting of molten steel starts or just before the completion of casting of one charge, in which the remaining amount of molten steel becomes small, a temperature of a portion of the molten steel pouring nozzle, which comes into contact with molten steel, becomes lower so that the movement and the aggregation of calcium oxide in each particle of zirconia clinker toward and on the surface of each particle of zirconia clinker are decreased or discontinued, and as a result, an amount of calcium oxide to react with alumina becomes insufficient. It is therefore impossible to effectively prevent adhesion and accumulation of the non-metallic inclusions such as α-alumina onto the surface of the bore of the molten steel pouring nozzle. With a content of calcium silicate of over 50 wt. %, on the other hand, the structure of the refractory is deteriorated, thus leading to a lower corrosion resistance and a lower refractoriness of the molten steel pouring nozzle. The content of calcium silicate should therefore be limited within a range of from 25.1 to 50 wt. %. With a view to improving the above-mentioned functions of calcium silicate and achieving a satisfactory surface smoothness of the nozzle, calcium silicate should preferably have an average particle size of up to 44 μm. As calcium silicate, for example, calcium metasilicate comprising 48.3 wt. % CaO and 51.7 wt. % $SiO_2$ may be used.

(5) Calcium oxide contained in calcium silicate:

Calcium oxide contained in calcium silicate ($CaO \cdot SiO_2$) has a function of replenishing the quantity of calcium oxide in zirconia clinker, which is to react with non-metallic inclusions such as α-alumina in molten steel. When a molar ratio of calcium oxide to silica in calcium silicate is 1:1, calcium oxide contained in calcium silicate never reacts violently with water or moisture in the air. With a content of calcium oxide in calcium silicate of under 40 weight parts relative to 100 weight parts of calcium silicate, there is unavailable a desired effect as described above of replenishing the quantity of calcium oxide in zirconia clinker. With a content of calcium oxide in calcium silicate of over 54 weight parts relative to 100 weight parts of calcium silicate, on the other hand, calcium oxide, which is not dissolved in the form of solid-solution into calcium silicate, violently reacts with water or moisture in the air to deteriorate the structure of the molten steel pouring nozzle. The content of calcium oxide in calcium silicate should therefore be limited within a range of from 40 to 54 weight parts relative to 100 weight parts of calcium silicate.

For the purpose of improving spalling resistance and oxidation resistance of the refractory forming the molten steel pouring nozzle, silicon carbide may further be added.

Now, embodiments of the molten steel pouring nozzle of the present invention are described with reference to the drawings.

FIG. 1 is a schematic vertical sectional view illustrating a first embodiment of the molten steel pouring nozzle of the present invention as an immersion nozzle. The molten steel pouring nozzle of the first embodiment is used as an immersion nozzle which is arranged between a tundish and a vertical mold arranged below the tundish. As shown in FIG. 1, the molten steel pouring nozzle 4 of the first embodiment of the present invention has, along the axis thereof, a bore 1 through which molten steel flows. An inner portion 2 of the molten steel pouring nozzle 4, which forms the bore 1, is formed of a refractory having the above-mentioned chemical composition. An outer portion 3 surrounding the inner portion 2 is formed of a refractory, for example, an alumina-graphite refractory having an excellent erosion resistance against molten steel. According to the above-mentioned molten steel pouring nozzle 4, it is possible to prevent for a long period of time adhesion and accumulation of the non-metallic inclusions such as α-alumina present in molten steel onto the surface of the inner portion 2 of the molten steel pouring nozzle 4, which forms the bore 1, even when a temperature of molten steel is low or molten steel contains a large amount of non-metallic inclusions such as α-alumina.

Figure 2:
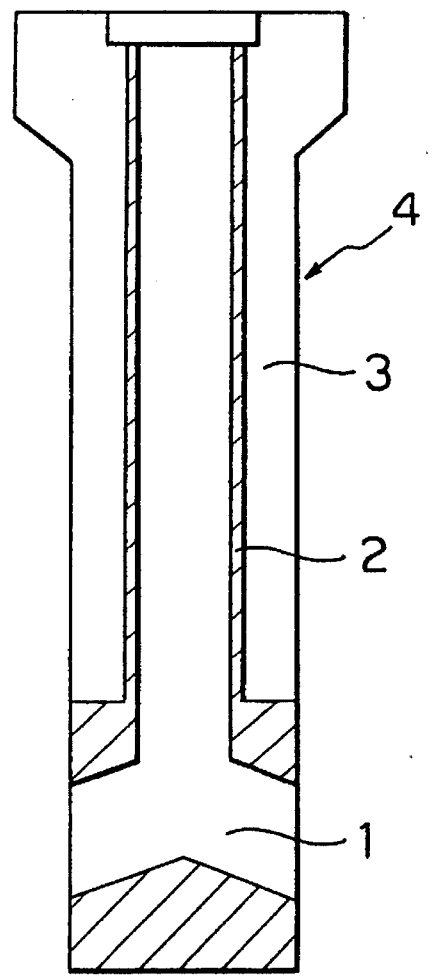
FIG. 2 is a schematic vertical sectional view illustrating a second embodiment of the molten steel pouring nozzle of the present invention as an immersion nozzle.

FIG. 2 is a schematic vertical sectional view illustrating a second embodiment of the molten steel pouring nozzle of the present invention as an immersion nozzle.

As shown in FIG. 2, a molten steel pouring nozzle 4 of the second embodiment of the present invention is identical in the construction to the above-mentioned molten steel pouring nozzle 4 of the first embodiment of the present invention, except that the entirety of a lower portion of the molten steel pouring nozzle 4, which forms a lower portion of a bore 1, is formed of a refractory having the above-mentioned chemical composition. Therefore, the same reference numerals are assigned to the same components as those in the first embodiment, and the description thereof is omitted.

The molten steel pouring nozzle 4 of the second embodiment has a service life longer than that of the molten steel pouring nozzle 4 of the first embodiment, since the refractory having the above-mentioned chemical composition, which forms the lower portion of the bore 1, where the reaction between calcium oxide and the non-metallic inclusions such as α-alumina takes place most actively, has a sufficient thickness as shown in FIG. 2.

Now, the molten steel pouring nozzle of the present invention is described more in detail by means of an example.

EXAMPLE

First, calcium oxide (CaO) and zirconia ($ZrO_2$) were melted in an electric furnace at a temperature of at least 1,600°C., then, the resultant melt was cooled to a room temperature to solidify same, and then, the resultant solid was pulverized in a ball mill to prepare zircoina clinker havnig an average particle size of up to 44 μm comprising calcium zirconate ($CaO \cdot ZrO_2$). The content of calcium oxide in the thus prepared zirconia clinker was within a range of from 8 to 35 weight parts relative to 100 weight pats of zirconia clinker.

Then, phenol resin in the state of powder and liquid was added in an amount within a range of from 5 to 10 wt. %, to each of blended raw materials Nos. 1 to 4 containing the above-mentioned zirconia clinker comprising calcium zirconate and having the chemical compositions within the scope of the present invention as shown in Table 1. Each of these blended raw materials Nos. 1 to 4 added with phenol resin, was mixed and kneaded to obtain a kneaded mass. A columnar formed body having dimensions of 30 mm×30 mm×230 mm for testing an amount of adhesion of the non-metallic inclusions such as α-alumina and corrosion resistance against molten steel, and a tubular formed body having an outside diameter of 100 mm, an inside diameter of 60 mm and a length of 250 mm for testing spalling resistance, were formed from each of the thus obtained kneaded masses. Then, these formed bodies were reduction-fired at a temperature within a range of from 1,000° to 1,200° C. to prepare samples outside the scope of the present invention (hereinafter referred to as the "samples for comparison") Nos. 5 to 9.

TABLE 1

(wt. %)

| Chemical composition of blended raw materials | Sample of the invention | | | | Sample for comparison | | | | |
| --- | --- | --- | --- | --- | --- | --- | --- | --- | --- |
| | No. 1 | No. 2 | No. 3 | No 4 | No. 5 | No. 6 | No. 7 | No. 8 | No. 9 |
| Zirconia clinker comprising calcium zirconate (CaO.ZrO$_2$) (44 μm) | 54 | 49 | 44 | 42 | 70 | 60 | 55 | 40 | 24 |
| Graphite (500 μm) | 16 | 16 | 16 | 13 | 20 | 20 | 25 | 25 | 16 |
| Calcium silicate (CaO.SiO$_2$) (44 μm) | 30 | 35 | 40 | 45 | 10 | 20 | 5 | 10 | 60 |
| Crystal-stabilized calcium silicate (2CaO.SiO$_2$, 3CaO.SiO$_2$) (44 μm) | — | — | — | — | — | — | 15 | 25 | — | non-metallic inclusions such as α-alumina and corrosion resistance against molten steel, and a tubular formed body having an outside diameter of 100 mm, an inside diameter of 60 mm and a length of 250 mm for testing spalling resistance, were formed from each of the thus obtained kneaded masses. Then, these formed bodies were reduction-fired at a temperature within a range of from 1,000° to 1,200° C. to prepare samples within the scope of the present invention (hereinafter referred to as the "samples of the invention") Nos. 1 to 4.

Then, phenol resin in the state of powder and liquid was added in an amount within a range of from 5 to 10 wt. %, to each of blended raw materials Nos. 5 to 9 containing the above-mentioned zirconia clinker comprising calcium zirconate and having the chemical compositions outside the scope of the present invention as shown in Table 1. Each of these blended raw materials Nos. 5 to 9 added with phenol resin, was mixed and kneaded to obtain a kneaded mass. A columnar formed body having dimensions of 30 mm×30 mm×230 mm for testing an amount of adhesion of the non-metallic inclusions such as α-alumina and corrosion For each of the above-mentioned columnar and tubular samples of the invention Nos. 1 to 4 and the samples for comparison Nos. 5 to 9, bulk specific gravity and porosity were measured. The results are shown in Table 2.

Then, each of the tubular samples of the invention Nos. 1 to 4 and the tubular samples for comparison Nos. 5 to 9, having an outside diameter of 100 mm, an inside diameter of 60 mm and a length of 250 mm, was heated in an electric furnace to a temperature of 1,500° C. for 30 minutes, and then, rapidly water-cooled to investigate spalling resistance. The resuls are shown in Table 2. Spalling resistance is represented, in Table 2, by means of a temperature at which cracks have occurred in the sample.

Subsequently, each of the columnar samples of the invention Nos. 1 to 4 and the columnar samples for comparison Nos. 5 to 9, having dimensions of 30 mm×30 mm×230 mm, was immersed into molten steel at a temperature of 1,540° C. containing aluminum in an amount within a range of from 0.06 to 0.10 wt. % for 180 minutes to investigate an erosion rate (%) and an amount of adhesion (mm) of the non-metallic inclusions such as α-alumina. The results are also shown in Table 2.

TABLE 2

| Property | Sample of the invention | | | | Sample for comparison | | | | |
| --- | --- | --- | --- | --- | --- | --- | --- | --- | --- |
|  | No. 1 | No. 2 | No. 3 | No. 4 | No. 5 | No. 6 | No. 7 | No. 8 | No. 9 |
| Prosity (%) | 22.0 | 21.7 | 21.1 | 20.2 | 19.0 | 18.6 | 19.0 | 18.7 | 15.0 |
| Bulk specific gravity | 2.53 | 2.52 | 2.51 | 2.53 | 2.76 | 2.73 | 2.75 | 2.63 | 2.42 |
| Erosion rate (%) | 8 | 10 | 13 | 15 | 3 | 5 | 4 | 5 | 30 |
| Spelling resistance (temperature of crack occurrence) (°C.) | 800 | 800 | 750 | 700 | 750 | 800 | 800 | 800 | 650 |
| Amount of adhesion of alumina (mm) | 1 | Almost zero | Almost zero | Almost zero | 8 | 5 | 6 | 4 | Almost zero |

As is clear from Table 2, all the samples of the invention Nos. 1 to 4 had a low erosion rate of up to 15%, so that it was possible to avoid deterioration of the structure of the refractory forming the nozzle. In addition, the samples of the invention Nos. 1 to 4 had no cracks even when rapidly water-cooled from the temperature near 700° C. to exhibit an excellent spalling resistance, and had almost no adhesion of the non-metallic inclusions such as α-alumina, thus permitting effective prevention of a reduction or a clogging of the bore of the molten steel pouring nozzle. The samples for comparison Nos. 5 to 9 had in contract a large amount of adhesion of the non-metallic inclusions such as α-alumina when the erosion rate was low, whereas the samples for comparison Nos. 5 to 9 had a high erosion rate when there was almost no adhesion of the non-metallic inclusions such as α-alumina. More specifically, the sample for comparison No. 5 had a large amount of adhesion of the non-metallic inclusions such as α-alumina, since the content of zirconia clinker comprising calcium zirconate was large outside the scope of the present invention and the content of calcium silicate was small outside the scope of the present invention. The samples for comparison Nos. 6 and 7 had a large amount of adhesion of the non-metallic inclusions such as α-alumina, since the content of calcium silicate was small outside the scope of the present invention. The sample for comparison No. 8 had a large amount of adhesion of the non-metallic inclusions such as α-alumina, since both the content of zirconia clinker comprising calcium zirconate and the content of calcium silicate were small outside the scope of the present invention. The sample for comparison No. 9 had cracks when rapidly water-cooled from the temperature of 650° C. to exhibit a poor spalling resistance, and showed a high erosion rate of 30%, although there was almost no adhesion of the non-metallic inclusions such as α-alumina, since the content of zirconia clinker comprising calcium zirconate was small outside the scope of the present invention and the content of calcium silicate was large outside the scope of the present invention.

According to the molten steel pouring nozzle of the present invention, as described above in detail, it is possible to stably prevent a reduction or a clogging of a bore of the nozzle caused by the adhesion of non-metallic inclusions such as α-alumina for a long period of time without causing deterioration of the structure of a refractory forming the nozzle, even when a temperature of molten steel is low or molten steel contains a large amount of non-metallic inclusions such as α-alumina, thus providing many industrially useful effects.

What is claimed is:

1. A molten steel pouring nozzle for use for molten steel containing 0.06 to 0,10 wt. % aluminum having, along the axis thereof, a bore through which molten steel flows, wherein:

at least part of an inner portion of said molten steel pouring nozzle, which inner portion forms said bore, is formed of a refractory consisting essentially of:

zirconia clinker comprising calcium zirconate: from 40 to 64.9 wt. %,
where, a content of calcium oxide in said zirconia clinker being within a range of from 8 to 35 weight parts relative to 100 weight parts of said zirconia clinker, graphite: from 10 to 35 wt. %, and calcium silicate: from 25.1 to 50 wt. %,
where, a content of calcium oxide in said calcium silicate being within a range of from 40 to 54 weight parts relative to 100 weight parts of said calcium silicate; and wherein said refractory has porosity of at least 20.2%.

2. A molten steel pouring nozzle as claimed in claim 1, wherein:

the entirety of said molten steel pouring nozzle is formed of said refractory.

3. A molten steel pouring nozzle as claimed in claim 1, wherein:

said inner portion of said molten steel pouring nozzle, which inner portion forms said bore, is formed of said refractory.

4. A molten steel pouring nozzle as claimed in claim 1 wherein:

said zirconia clinker has an average particle size of up to 44 μm; said graphite has an average particle size of up to 500 μm; and said calcium silicate has an average particle size of up to 44 μm.

5. A molten steel pouring nozzle as claimed in claim 2, wherein:

said zirconia clinker has an average particle size of up to 44 μm; said graphite has an average particle size of up to 500 μm; and said calcium silicate has an average particle size of up to 44 μm.

6. A molten steel pouring nozzle as claimed in claim 3, wherein:

said zirconia clinker has an average particle size of up to 44 μm; said graphite has an average particle size of up to 500 μm; and said calcium silicate has an average particle size of up to 44 μm.

7. A molten steel pouring nozzle as claimed in claim 1, wherein said refractory has a porosity of 20.2%.

8. A molten steel pouring nozzle as claimed in claim 1, wherein said refractory has a porosity of 21.1%.

9. A molten steel pouring nozzle as claimed in claim 1, wherein said refractory has a porosity of 21.7%.

10. A molten steel pouring nozzle as claimed in claim 1, wherein said refractory has a porosity of 22.0%.

* * * * *